United States Patent
Sugita et al.

(10) Patent No.: US 8,379,168 B2
(45) Date of Patent: Feb. 19, 2013

(54) LIQUID CRYSTAL DISPLAY ELEMENT AND LIQUID CRYSTAL DISPLAY DEVICE HAVING PARTICULAR LIGHT COLLECTING ELEMENTS

(75) Inventors: Tatsuya Sugita, Takahagi (JP); Shinji Sekiguchi, Kawasaki (JP); Atsushi Kishioka, Yokohama (JP); Shinichi Komura, Mobara (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 777 days.

(21) Appl. No.: 12/542,136

(22) Filed: Aug. 17, 2009

(65) Prior Publication Data

US 2010/0053500 A1 Mar. 4, 2010

(30) Foreign Application Priority Data

Sep. 4, 2008 (JP) ................................. 2008-227197

(51) Int. Cl.
*G02F 1/1335* (2006.01)
*G02F 1/136* (2006.01)

(52) U.S. Cl. .............. 349/95; 349/114; 349/51; 349/61; 349/62

(58) Field of Classification Search .................... 349/95, 349/57, 61, 62, 114
See application file for complete search history.

(56) References Cited

U.S. PATENT DOCUMENTS

| 5,276,538 | A  | * | 1/1994  | Monji et al. ..................... 349/95 |
| 6,924,856 | B2 | * | 8/2005  | Okumura et al. ................ 349/96 |
| 7,164,454 | B2 | * | 1/2007  | Numata et al. .................. 349/95 |
| 2004/0233354 | A1 | * | 11/2004 | Uehara et al. ................. 349/113 |
| 2008/0094547 | A1 |   | 4/2008  | Sugita et al. |

FOREIGN PATENT DOCUMENTS

| JP | 06-130497  | 5/1994 |
| JP | 2006-004736 | 1/2006 |
| JP | 2008-102416 | 5/2008 |

* cited by examiner

*Primary Examiner* — Mike Qi
(74) *Attorney, Agent, or Firm* — Atonelli, Terry, Stout & Kraus, LLP.

(57) ABSTRACT

An object of the present invention is to provide a liquid crystal display device where there are fewer moiré effects between lenticular lenses and the backlight. The present invention provides a liquid crystal display device where the arrangement or form of lenticular lenses 1 varies in waveform so that the center line of the lenses, the width of the lenses, and the height of the lenses vary in the case where light emitted from a backlight 59 is collected into openings 15 for transmitting light by means of lenticular lenses 1.

15 Claims, 7 Drawing Sheets

LIQUID CRYSTAL DISPLAY ELEMENT AND LIQUID CRYSTAL DISPLAY DEVICE HAVING PARTICULAR LIGHT COLLECTING ELEMENTS

The present application claims priority over Japanese application JP 2008-227197 filed on Sep. 4, 2008, the contents of which are hereby incorporated into this application by reference.

BACKGROUND OF THE INVENTION (1) Field of the Invention

The present invention relates to transmission type or semi-transmission type liquid crystal display elements and liquid crystal display devices using such a liquid crystal display element.

(2) Related Art Statement

Conventional liquid crystal panels where an array of protruding micro-lenses having a recess at the top is formed on the surface of a transparent substrate on the backlight side so that fewer moiré fringes are produced due to an optical sheet having a regular structural pattern have been proposed (see, for example, Patent Document 1).

In addition, conventional transmission type projection screens made of a Fresnel lens sheet and a lenticular lens sheet where a liquid crystal panel is used together with a projector used as a light bulb, and lenticular lenses are formed at irregular intervals on the lenticular lens sheet so that there are fewer moiré effects resulting from mutual effects between a number of pixels in the liquid crystal panel projected onto and enlarged on the transmission type projection screen, and the lenticular lenses having sampling effects have been proposed (see, for example, Patent Document 2).

As is pointed out in Patent Document 1, a problem arises with liquid crystal display devices such that there are moiré effects in the regular structure on the backlight, for example, the structure for light emission formed on the prism sheet or the light guiding plate, when a regular micro-lens array is provided between the liquid crystal display element and the backlight.

In addition, in Patent Document 1, there are fewer moiré fringes when an array of protruding micro-lenses in a particular form having a recess at the top is used, and a problem arises where it is difficult to create this array of micro-lenses in a complex form.

Furthermore, as shown in Patent Document 2, there are fewer moiré effects in the regular structure when the lenticular lenses are at irregular intervals. However, in the case where micro-lenses are arranged in an array so as to match the intervals of the pixels in the liquid crystal display device as in Patent Document 1, it is necessary for the lenses to be at regular intervals, and this concept cannot be applied.

[Patent Document 1] Japanese Unexamined Patent Publication 2006-47360

[Patent Document 2] Japanese Unexamined Patent Publication H6 (1994)-130497

SUMMARY OF THE INVENTION

Problem to be Solved by the Invention

An object of the present invention is to provide a liquid crystal display device having a simple structure where there are fewer moiré effects between light collecting elements and a surface light emitting element.

Means for Solving Problem

In order to achieve the above described object, the liquid crystal display element according to the present invention has:

a pair of substrates, upper and lower;

a pair of polarizing plates sandwiching the above described pair of substrates from the top and the bottom;

a liquid crystal layer sandwiched between the above described pair of substrates; and a number of openings for transmitting light which are created within pixels provided on one of the above described substrates and regulate the amount of light which transmits through the above described liquid crystal layer, and is characterized in that light collecting elements for collecting light in the above described openings for transmitting light are provided on the above described lower substrate side, and the above described light collecting elements are formed continuously so as to correspond to the above described number of openings for transmitting light, and the form of the above described light collecting elements varies in a plane parallel to the above described lower substrate.

It is desirable for the maximum value of the displacement of the center line of the light collecting element to be smaller than the width of the openings for transmitting light. In addition, it is desirable for the intervals of the displacement of the light collecting elements in the column direction to be 100 μm or less, or the intervals of said pixels or less, and it is desirable for the difference in the displacement between adjacent light collecting elements to be 4% or more of the pixel intervals. Furthermore, it is desirable for the focal distance of the above described light collecting elements to be approximately constant within the columns where the light collecting elements are formed continuously, and the light collecting elements can be formed by patterning the application of a liquid material and curing the above described liquid material.

In order to achieve the above described object, the liquid crystal display device according to the present invention is provided with a liquid crystal display element having:

a pair of substrates, upper and lower;

a pair of polarizing plates sandwiching the above described pair of substrates from the top and the bottom;

a liquid crystal layer sandwiched between the above described pair of substrates;

a number of openings for transmitting light which are created within pixels provided on one of the above described substrates and regulate the amount of light which transmits through the above described liquid crystal layer; and light collecting elements for collecting light in the above described openings for transmitting light are provided on the above described lower substrate side, and is characterized in that the lower side of the polarizing plate on the lower side of the above described liquid crystal display element is provided with a surface light emitting element having:

a prism sheet having a number of prism columns;

a light guiding plate for transmitting a light beam that enters from a light source by repeatedly reflecting the light beam; and a reflective sheet provided on the side opposite to the side of the above described light guiding plate from which light emits, wherein the form of the above described light collecting elements which are formed continuously so as to correspond to the above described number of openings for transmitting light varies in a plane parallel to the above described lower substrate.

The present invention provides great effects, particularly when the ridge lines of the light collecting elements are approximately parallel to the ridge lines of the above described columns of prisms. It is desirable for the maximum value of the displacement of the center of the light collecting elements to be $1/16$ or more of the intervals of the prism columns on the prism sheet. In addition, the invention can be applied in the case where the light collecting elements and the prism columns on the prism sheet are arranged so as to face each other. Furthermore, it is desirable for the intervals $P_s$ of the prism columns on the prism sheet to satisfy the following formula when the view angle of the surface light emitting element is θ, the focal distance of the light collecting elements is f, and the width of the openings for transmitting light is $W_a$.

$$P_s < 4(W_a - 2f \tan(\theta/2)) \quad \text{Formula}$$

Effects of the Invention

According to the present invention, the center line of the light collecting elements formed continuously so as to correspond to the columns of the openings for transmitting light is displaced relative to the openings for transmitting light, or the width of the light collecting elements varies, and at the same time, the height of the light collecting elements varies in relation to the width of the light collecting elements, and thus, liquid crystal display elements where there are no moiré effects between the light collecting elements and the surface light emitting element, as well as a liquid crystal display device using these liquid crystal display elements, can be provided.

EXPLANATION OF SYMBOLS

1 . . . lenticular lens
2 . . . center of lenticular lens
3 . . . light beam
4 . . . space between lenses
7 . . . polarizing plate
9 . . . upper substrate
11 . . . color filter
13 . . . liquid crystal layer
15 . . . openings for transmitting light
17 . . . lower substrate
31 . . . light guiding plate
33 . . . reflective groove
35 . . . reflective sheet
37 . . . LED
39 . . . first prism sheet
41 . . . second prism sheet
53 . . . sub-pixel
55 . . . pixel
57 . . . liquid crystal display element
59 . . . backlight

DETAILED DESCRIPTION OF THE INVENTION

First Embodiment

In the following, the first embodiment, which is the best mode for carrying out the present invention, is described in detail in reference to FIGS. 1 to 5.

Figure 1:
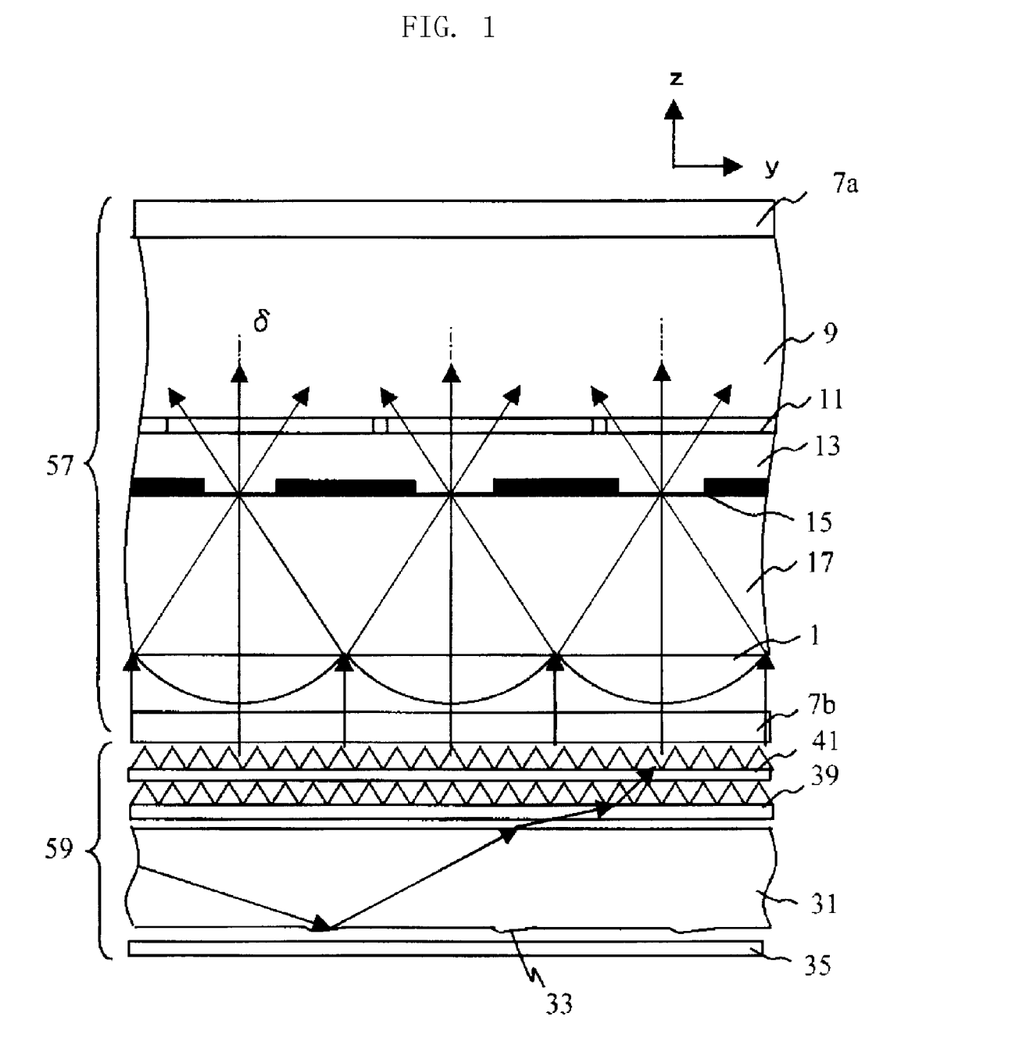
FIG. 1 is a cross sectional diagram showing the liquid crystal display device according to the first embodiment of the present invention.

FIG. 1 is a cross sectional diagram showing a surface light emitting element and a liquid crystal display element which form a liquid crystal display device.

FIG. 1 shows a liquid crystal display element 57 and a backlight 59, which is a surface light emitting element, and guides light from a light source through a light guiding plate so that the light enters the liquid crystal display element 57 by means of a prism sheet.

The light beam which enters from the light source (not shown, but provided on the left outside FIG. 1) transmits through a light guiding plate 31, which is a light guiding body, while repeating reflection.

Reflective grooves 33 are provided on the bottom of the light guiding plate 31, that is to say, on the side opposite to the liquid crystal display element 57 (side opposite to the side from which light is emitted), and in addition, a reflective sheet 35 is provided outside the reflective grooves 33 on the side opposite to the side from which light is emitted.

The angle of transmission of light beams which reflect from the reflective grooves 33 becomes wider within the light guiding plate 31, and as a result, the angle at which the light beam enters through the interface of the light guiding plate 31 becomes smaller.

Light beams which enter at an angle that is smaller than the critical angle with the interface of the light guiding plate 31 are wholly emitted from the liquid crystal display element 57 side, or partly emitted from the light guiding plate 31 on the reflective sheet 35 side.

Light beams on the reflective sheet 35 side transmit through the light guiding plate 31 and are reflected from the reflective sheet 35 so as to enter the liquid crystal display element 57.

The distribution of the angles at which light is emitted from the light guiding plate 31 can be controlled by adjusting the form of the reflective grooves 33, and in the present embodiment, it is desirable for the distribution of the angles at which light is emitted to be narrow.

In the backlight 59, a first prism sheet 39 and a second prism sheet 41 are layered on the light guiding plate 31 on the liquid crystal display element 57 side in this order.

The first and second prism sheets 39 and 41 direct light emitted from the backlight 59 to the front (upward direction in FIG. 1), and can improve the directivity (narrow the angle at which light beams spread).

The directivity improves mainly as a result of the first prism sheet 39, and the emitted light is directed to the front by means of the first prism sheet 39 and the second prism sheet 41. The prisms on the first prism sheet 39 and the second prism sheet 41 are characterized by their asymmetrical form; the two bottom angles are different.

The liquid crystal display element 57 according to the present embodiment is formed of a polarizing plate 7a at the top, an upper substrate 9 provided on the bottom side of the polarizing plate 7a, a color filter 11 provided on the bottom side of the upper substrate 9, a liquid crystal layer 13 provided on the bottom side of the color filter 11, a lower substrate 17 provided n the bottom side of the liquid crystal layer 13, lenticular lenses 1 provided on the bottom side of the lower substrate 17, and a polarizing plate 7b provided on the bottom side of the lenticular lenses 1.

That is to say, the liquid crystal display element 57 according to the present embodiment is provided with a pair of substrates (9, 17); an upper substrate 9 and a lower substrate 17, and a pair of polarizing plates (7a, 7b) which sandwich the pair of substrates (9, 17). In addition, the liquid crystal display element 57 according to the present embodiment is formed of a liquid crystal layer 13 placed between the pair of substrates (9, 17) with openings 15 for transmitting light, and lenticular lenses 1 which are provided between the lower substrate 17 and the backlight 5, which are light collecting elements for collecting light emitted from the backlight 59 in the openings for transmitting light 15.

Thus, in the liquid crystal display element 57 according to the present embodiment, the lenticular lenses 1 collect light emitted from the backlight 59 in the openings for transmitting light 15, so that the amount of light which transmits through the openings for transmitting light 15 can be increased.

In addition, light beams that transmit through the openings for transmitting light transmit through the liquid crystal layer 13, the color filter 11, the upper substrate 9 and the polarizing plate 7a, so that an image can be displayed by changing the transmittance of light beams which transmit through the openings for transmitting light 15.

In the case where light is collected using micro lenses, the amount of light which transmits through the openings for transmitting light 15 can be increased and the view angle widened by reducing the thickness of the lower substrate 17.

Meanwhile, when the lower substrate 70 is thick, the brightness in the front becomes high, and therefore, it is desirable to set the thickness of the lower substrate 17 in accordance with the properties required for the display device.

In addition, a reflective display portion can be provided in addition to openings for transmitting light 15, so that a semi-transmissive liquid crystal display device can be provided.

The liquid crystal display element 57 may have the same configuration as conventionally used semi-transmission type liquid crystal display elements, and in the case of an active matrix drive, thin film transistors (TFT's) may be provided in the reflective display portion, so that switching is possible in the liquid crystal layer.

Figure 2:
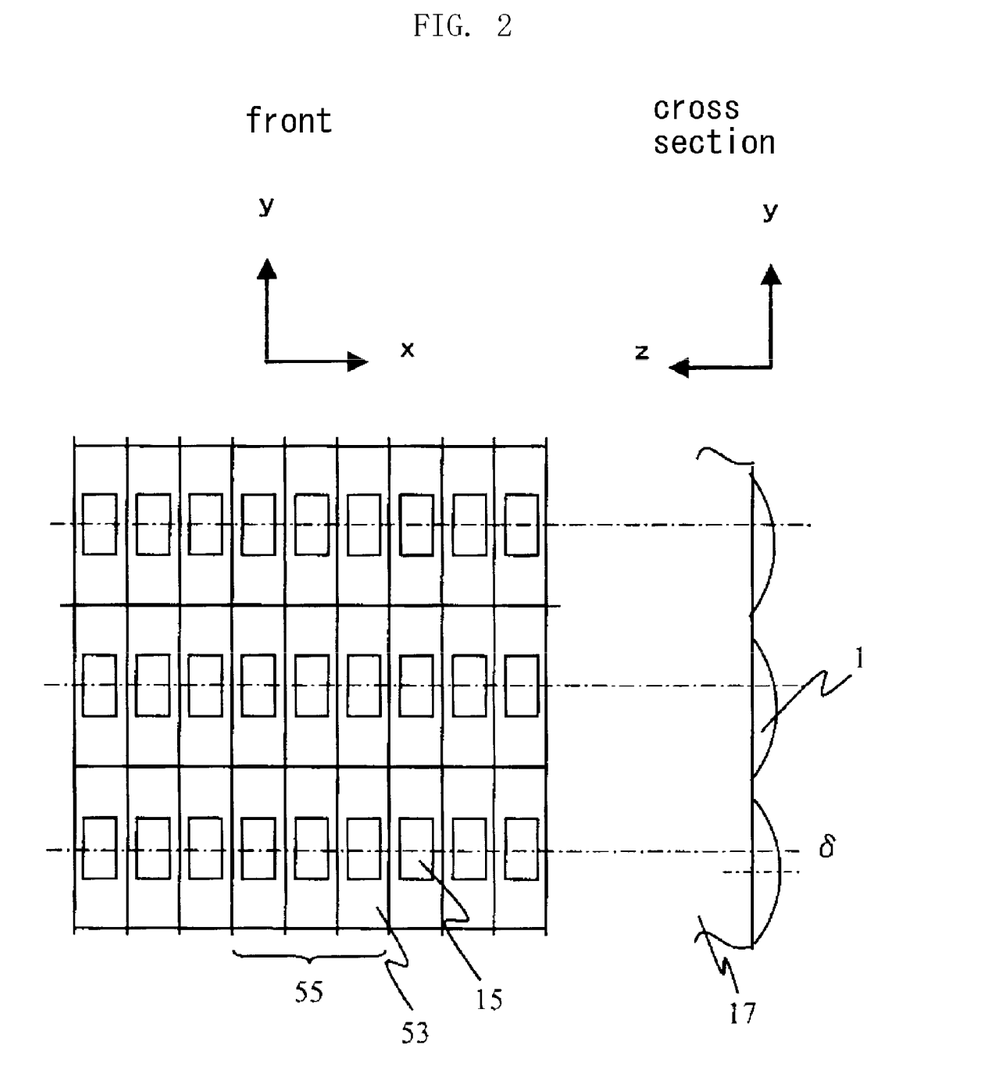
FIG. 2 is a diagram showing the arrangement between pixels and lenticular lenses according to the first embodiment of the present invention.

FIG. 2 is a diagram showing the relationship in the arrangement between pixels and lenticular lenses 1.

In FIG. 2, pixels 55 are arranged in a matrix, and each pixel 55 is further divided into sub-pixels 53 for three colors: R, G and B.

The sub-pixels 53 are aligned in the horizontal direction (row direction; direction of x axis in the figure), that is to say, in the left-right direction when the screen is viewed. Therefore, the lenticular lenses 1 have a curvature in the direction of the y axis, and thus are long in the direction of the x axis.

These lenticular lenses 1 are used to collect light emitted from the backlight 59 having high directivity in the direction of the y axis.

Figure 3:
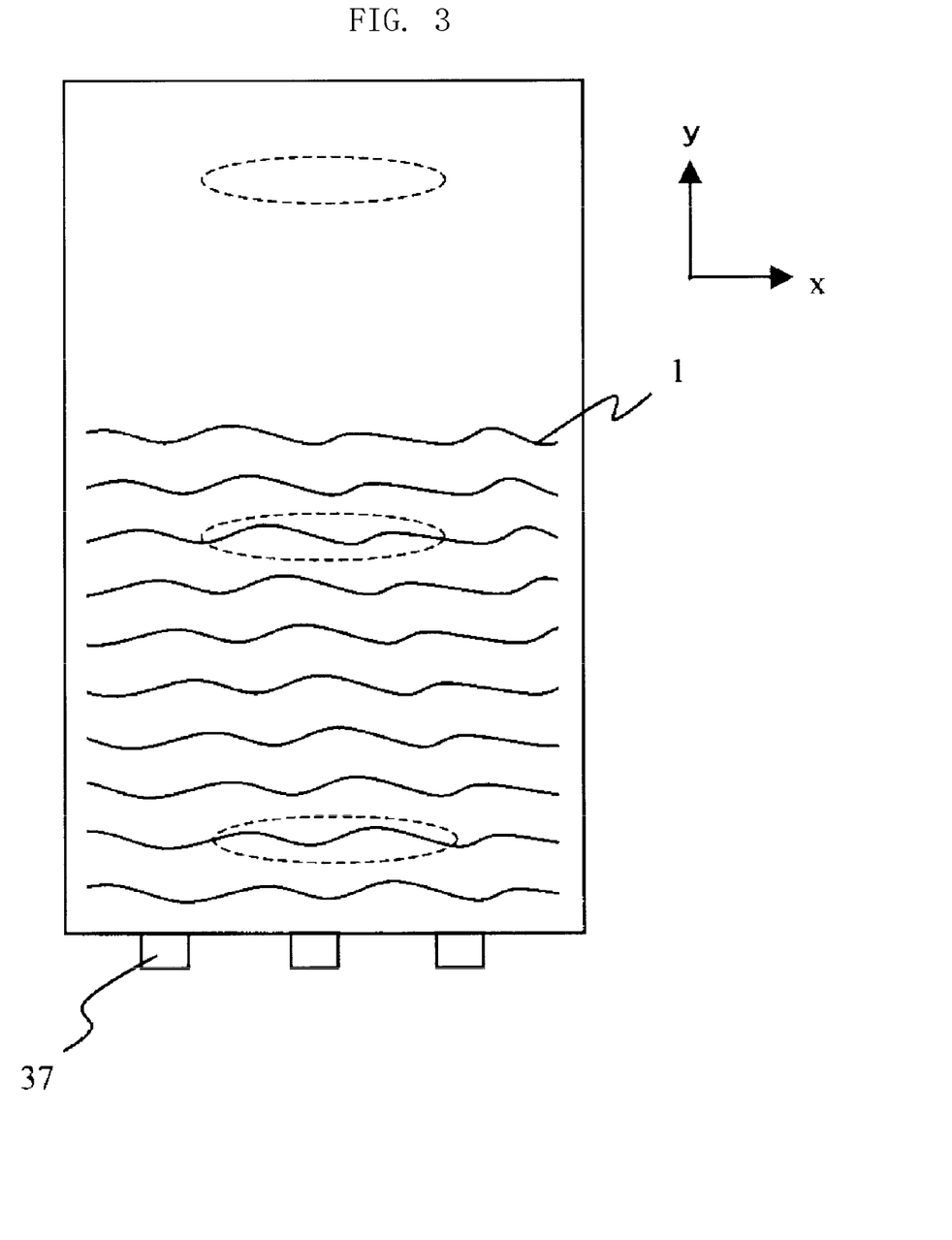
FIG. 3 is a front diagram showing the pixels and lenticular lenses according to the first embodiment of the present invention.

FIG. 3 is a front diagram showing image display elements.

In FIG. 3, the dotted ellipses conceptually show the directivity of light coming from the backlight 59. As shown in FIG. 3, the light collected by the lenticular lenses 1 has high directivity in the direction of the y axis, as well as a wide view angle in the direction of the x axis.

It is generally desirable for image display devices to be arranged so that the direction of the x axis having a wide view angle is the left-right direction, and the direction of the y axis having high directivity is the up-down direction. Therefore, the lenticular lenses 1 are used in accordance with the openings for transmitting light 15 of the sub-pixels aligned in the direction of the x axis, so that light is collected.

It is desirable for the spread angle of the light emitted from the backlight 59 to be adjusted so that a desired view angle can be gained in the x direction in which light is not collected by the lenticular lenses 1.

Thus, the directivity is high in one direction in the coordinates in the case where light is collected using the lenticular lenses 1 as light collecting elements, and it is desirable for the distribution of the angle at which light is emitted to be wide in the direction of another, perpendicular axis.

In order for the lenticular lenses 1, which are light collecting elements, to function to increase the amount of light which transmits through the openings for transmitting light 15, it is necessary for the angle at which light emitted from the backlight 59 spreads to be small.

It is desirable for the angle at which light spreads in the direction in which the lenticular lenses 1 collect light (full angle at half maximum) to be at least 14°, or 10° or less.

In the present embodiment, the directivity increases in the direction of one axis as a result of the prism sheet 39 and the prism sheet 41.

Therefore, the surface light emitting element used in the present embodiment can provide high directivity at least in the direction of one axis (direction of y axis in present embodiment).

Accordingly, the light collecting function can be sufficiently used in the case where light collecting elements, particularly lenticular lenses 1, are used.

In this case, it is desirable for the ridge lines of the prisms on the second prism sheet 41 and the ridge lines of the lenticular lenses 1 to be close to parallel.

When the ridge lines of the prisms on the second prism sheet 41 and the ridge lines of the lenticular lenses 1 are close to parallel, however, there are moiré effects, due to the regularity of the two.

Thus, the arrangement of the lenticular lenses 1 is made irregular, or the form of the lenticular lenses 1 is changed within a certain distribution, in order to reduce the moiré effects. In particular, in the present embodiment, the lenticular lenses 1 are wobbled in waveform, and thus, the moiré effects are reduced.

The waved lines in FIG. 3 are the center of the lenticular lenses 1 (ridge lines of lenses). When the center line of the lenses wobbles and fluctuates, the width of the lenses or the height of the lenses can be changed.

Thus, (1) the regularity of the lenticular lenses 1 is reduced, so that the spatial frequency component for the moiré effects can be reduced, or (2) the center line of the lenticular lenses 1 is changed, so that the moiré phase changes at random in the direction in which the lenticular lenses 1 are aligned, and it can be made difficult for moiré fringes to appear, and therefore, the image quality can be prevented from deteriorating due to moiré effects.

In the present embodiment, the application of a liquid lens material is wobbled and patterned, and after that cured, so that lenticular lenses 1 are formed. In the case where a liquid lens material is used in this manner, the radius of the curvature of the lenses is determined by the amount of the lens material, the surface tension of the lens material, and the wettability with the substrate, and therefore, the radius of the curvature of the lens barely changes and is almost constant, even when the lenticular lenses 1 are wobbled.

Therefore, the height of the lenses changes in accordance with the width of the lenses, so that the radius of the curvature becomes constant when the width of the lenses is changed. Thus, the radius of the curvature is almost constant, and therefore, the paraxial focal distance of the lenses barely changes.

In addition, when the height of the lenses changes, dispersion of light can be achieved in the direction perpendicular to the direction in which the lenticular lenses 1 collect light, and thus, there are less moiré effects.

In addition, when the height of the lenses changes, the view angle of the lenticular lenses 1 in the longitudinal direction can be widened.

These lenses can be formed using offset printing, for example. That is to say, recesses in an intaglio corresponding to the form of the lenticular lenses 1 in a wobbled arrangement are filled in with a lens material, which is transferred to a transferring roller with a blanket and be transferred to the lower substrate 17 when the openings for transmitting light 15 are positioned.

Thus, the lens material becomes round, due to the surface tension on the lower substrate 17, and thus, lenses are formed.

As the lens material, a UV curing resin or a thermosetting resin can be used, and acryl based resins, epoxy based resins, acryl epoxy based resins and the like can be used as the resin material.

In the case where a UV curing resin is used, the lens material is transferred onto the lower substrate 17, which is then irradiated with UV rays so as to be cured.

In addition, in the case where lenses are formed on the liquid crystal display element 57 from a thermosetting resin, it is desirable for the resin to be cured at 150° C. or lower, or 100° C. or lower, if possible, so that the properties of the liquid crystal display element are not affected.

When the lenses are formed using offset printing as described above, the precision in the form and position of the lenses can be improved, and inconsistency can be reduced. Therefore, the liquid crystal display element 57 according to the present embodiment can be applied to liquid crystal panels having high precision.

In addition, inkjet printing can be used to form the lenses.

In the case where inkjet printing is used, a pattern can be printed directly on the lower substrate 17, using a UV curing resin or a thermosetting resin. Alternatively, liquid repellant treatment may be carried out in portions between the lenses in advance, so that the lens material can be applied in a desired form with high precision.

Though the method for fabricating lenses is not limited to these, the process for patterning is simple, and appropriate lenticular lenses 1 can be formed following the wobbled pattern of the lenses, and in addition, the height of the lenses can easily change following the width of the lenses when a liquid lens material is used and the application thereof is patterned.

In order to form the lenses directly on the lower substrate, as described above, it is desirable for the lens material to have a low viscosity.

In the case where the viscosity of the lens material is too high to gain a desired lens form, the lens material may be heated, so that the viscosity lowers and a desired form can be gained.

In addition, a photolithographic method can also be used as the method for forming lenses.

In the case of a photolithographic method, the resist patterned through photolithography is heated so as to be converted to a liquid, and thus, lenses are formed, as a result of surface tension. Therefore, lenticular lenses of which the height varies in accordance with the width can be formed. In addition, in the case of a 2P (photopolymer) method, lenses fabricated in accordance with another method may be transferred when preparing a mold.

Figure 4:
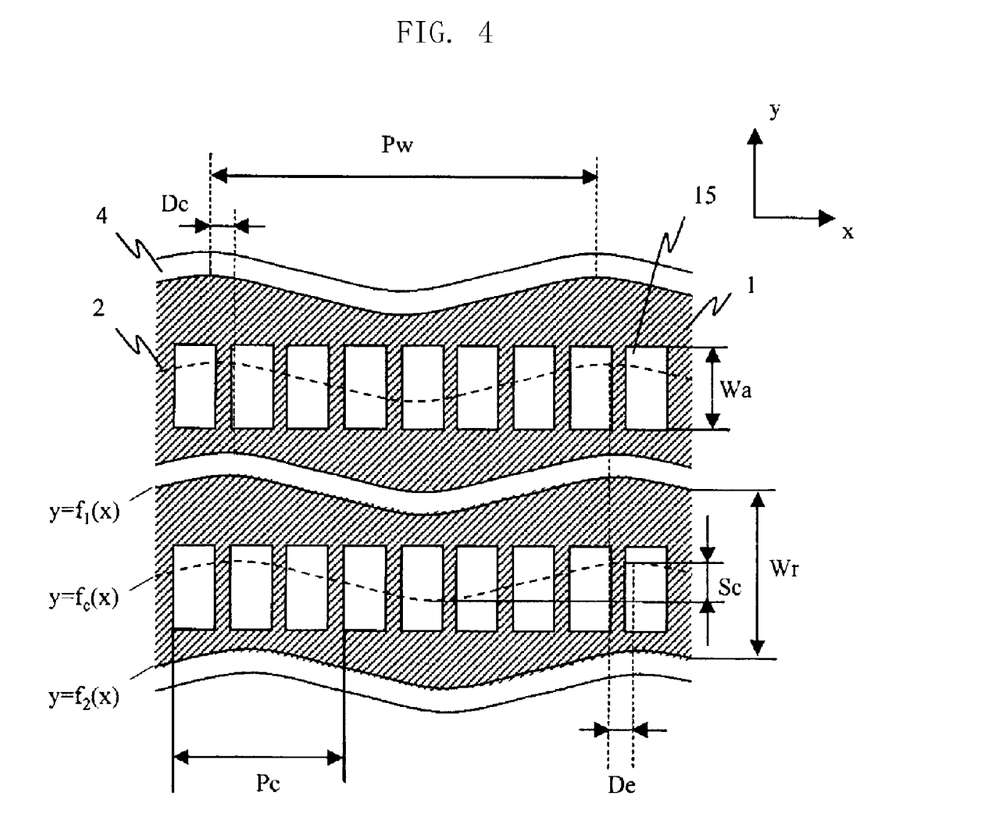
FIG. 4 is a front diagram showing wobbling of the lenticular lenses according to the first embodiment of the present invention.

FIG. 4 shows lenticular lenses 1 in a wobbled arrangement according to the present embodiment.

In the present embodiment, the intervals of lenses in the case where the lenticular lenses 1 are not in a wobbled arrangement is the same as the pixel intervals $P_c$, and therefore, the moiré intervals $P_m$ between the second prism sheet 41 and the lenticular lenses 1 can be represented by the following formula, when $P_s$ is the intervals of the prisms on the second prism sheet 41, and k and n are integers:

[Formula 1]

$$\frac{1}{P_m} = \frac{k}{P_c} - \frac{n}{P_s} \tag{1}$$

In general, higher order spatial frequencies have a small amplitude, and a value of the order of k and n which makes for more effects is approximately 1 to 3.

In addition, the moiré intensity can be represented by the product of the intensity of the primary spatial frequency component ($k/P_c$) of the lenticular lenses 1, and the nth spatial frequency component ($n/P_s$) of the second prism sheet 41.

Here, in the case where the intervals of the lenticular lenses 1 are different from the pixel intervals, the pixel intervals $P_c$ may be taken to be intervals of the lenticular lenses 1.

When the lenticular lenses 1 are in a wobbled arrangement, their position relative to the prisms on the second prism sheet 41 differ, depending on the location. When a lens is displaced relative to a prism by $P_s/2$, the phase of moiré fringe is inverted, so that the location of a bright portion and a dark portion is inverted.

Accordingly, when the width $S_c$ of the displacement of the center 2 of the lenticular lenses is adjusted so that the following formula is satisfied, the center 2 of the lenticular lens is displaced relative to a prism on the prism sheet by $P_s/2$ or more.

[Formula 2]

$$S_c \geq \frac{P_s}{4} \tag{2}$$

Thus, the phases of darkness and brightness resulting from moiré effects are inverted, and moiré fringes disappear as viewed macroscopically.

When moiré fringes disappear, the image quality can be prevented from lowering. In particular, when change in the phase of moiré fringes is small in comparison with the resolution of the eye, it becomes difficult to see moiré fringes.

Thus, the effects of reducing moiré fringes are great when the width of displacement $S_c$ satisfies the formula (2). However, some effects may be gained as a result of change in the phase of moiré fringes, depending on the location, even when the formula (2) is not satisfied.

That is to say, the location of moiré fringes changes by $P_m/2$ or more (90° in the phase), and effects of reducing moiré fringes can be gained even when $S_c \geq P_s/8$. Furthermore, the location of moiré fringes changes by $P_m/4$ or more, and effects of reducing moiré fringes can be gained even when $S_c \geq P_s/16$.

In the case where the prism intervals are 30 μm or more, which makes it easy to process the prisms, for example, it is desirable for the displacement width $S_c$ to be 1.9 μm or more, 3.8 μm or more, or 7.5 μm or more.

In addition, in the case where the prism intervals are 50 μm or more, as on conventionally used prism sheets, it is desirable for the displacement width $S_c$ to be 3.1 μm or more, 6.3 μm or more or 12.5 μm or more.

In order to further reduce moiré fringes, it is desirable for the intervals of the prisms on the second prism sheet 41 to be change depending on the location.

In this case, $P_s$ in the formula (1) and the formula (2) may be the average value of the prism intervals in a plane. Alternatively, $P_s$ may be determined from the peak of the spatial frequency in the case where the location of the ridge lines of the prisms is Fourier converted.

In the case where the lenticular lenses 1 are put in a wobbled arrangement, the brightness in the direction of the front may lower, due to light passing through the liquid crystal display device 57, when the center of the lenticular lenses 2 is displaced from the area of the openings for transmitting light 15. In order to prevent the brightness from lowering in this manner, it is necessary for the following formula to be satisfied when $W_a$ is the width of the openings for transmitting light 15:

[Formula 3]

$$S_c < W_a \quad (3)$$

Figure 5:
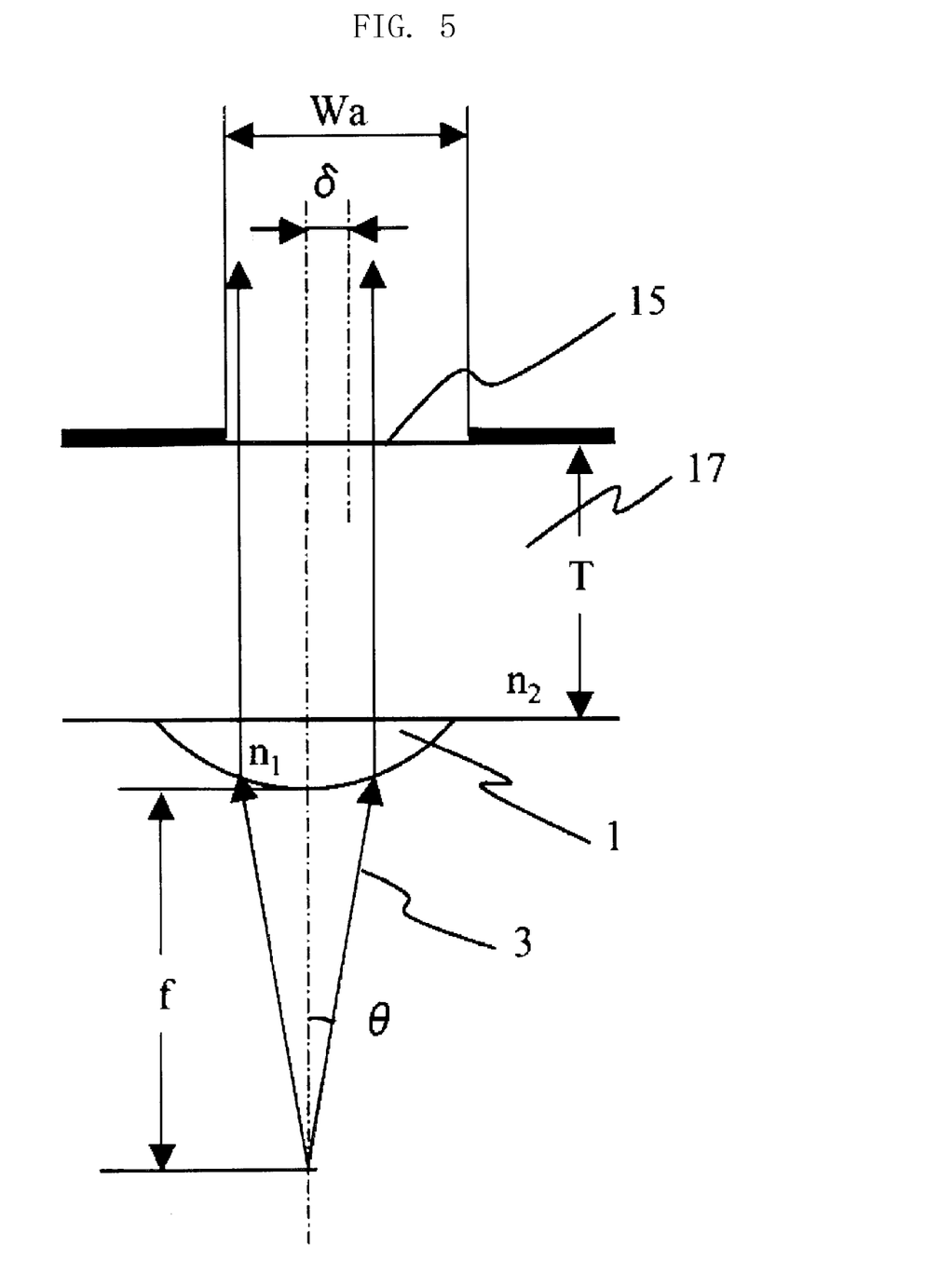
FIG. 5 is a cross sectional diagram illustrating the amount of wobbling of the lenticular lenses according to the first embodiment of the present invention.

In addition, it is more desirable for the displacement width $S_c$ of the center of the lenticular lenses 2 to be set so that the following formula is satisfied when f is the focal distance of the lenses and θ is the half-value width (full angle at half maximum) of the view angle of light coming from the backlight, as shown in FIG. 5, taking the spread of light coming from the backlight 59 into consideration.

[Formula 4]

$$S_c < W_a - 2f \tan(\theta/2) \quad (4)$$

The focal distance f can be found using the below formula (6), or f' in the formula (7) may be used.

It can be seen from the formula (2) and the formula (4) that it is desirable for the prism intervals $P_s$ to satisfy the following formula:

[Formula 5]

$$P_s < 4(W_a - 2f \tan(\theta/2)) \quad (5)$$

According to this formula (5), in the case where the width $W_a$ of the openings for transmitting light 15 is great, the brightness in the front can be prevented from lowering, and at the same time, moiré fringes can be prevented, when the prism intervals $P_s$ are increased and the lenticular lenses 1 are in a wobbled arrangement.

It is desirable for the prism intervals $P_s$ to be great because this makes it easy to process the prism sheet. $P_s$<95 μm, for example, may be satisfactory when the width $W_a$ of the openings $P_s$ is 50 μm, the spread angle of the backlight is 5°, and the focal distance is 150 μm.

Meanwhile, it is desirable for the prism intervals on the second prism sheet 41 to be smaller than the intervals of the lenticular lenses 1, in order to reduce the moiré effects.

That is to say, it is desirable for the prism intervals on the second prism sheet 41 to be small enough for it to be possible to place a number of prisms within the pixels of the liquid crystal display element 57, and it is desirable for the prism intervals to allow for three prisms per lenticular lens, for example; that is to say, for $P_c$ to be equal to or greater than $3P_s$.

In addition, it is desirable to select such a combination of the prism intervals and the intervals of the lenticular lenses 1 that the moiré period $P_m$ is small in the formula (1), because this makes it difficult for moiré fringes to appear. Therefore, it is desirable for the difference in the intervals between the lenticular lenses 1 and the prisms to be great.

Here, in the present embodiment, the moiré effects are reduced by putting the lenticular lenses 1 in a wobbled arrangement, and therefore, it is not necessary to make the intervals of the prisms small.

The amount of light that transmits through the openings for transmitting light 15 becomes maximum when the best point for light collection, where the diameter of the spot where light is collected is minimum, is located in the opening for transmitting light 15.

In addition, the best spot location, where the diameter of the spot is minimum, can be determined using a simulation, for example for ray tracing, and in the present embodiment, the lenses are irradiated with light beams which are almost parallel and have high directivity, and therefore, the best spot location can be analytically found when spherical lenses are used.

The paraxial focal distance of plano-convex spherical lenses (having an index of refraction $n_1$ and a radius of curvature R) used in the present embodiment in the air can be represented by the following formula:

[Formula 6]

$$f = \frac{1}{n_1 - 1} R \quad (6)$$

Here, the best image focal point, where the diameter of the spot where light is collected is minimum shifts to the lens side from the paraxial focal point, due to the spherical aberration of the lenses in the case where the lenses are spherical.

The best image focal distance f' in the air in the case where parallel light enters a lens is represented by the following formula:

[Formula 7]

$$f' = f - \frac{3}{8} \frac{n_1^2}{n_2^2 (n_1 - 1)^3} R \left(\frac{D}{2f}\right)^2 \quad (7)$$

In the formula (7), $n_2$ is the index of refraction of the lower substrate 17, and D is the width of the lenticular lenses.

Therefore, in the case where the thickness of the lower substrate 17 is a constant, the radius of curvature R of the lenses and the width D of the lenses can be set so that the best image focal point of the lenses is located in the opening for transmitting light 15, that is to say, $f=T/n_2$ can be satisfied in accordance with the thickness T of the substrate, and thus, the amount of light that transmits can be maximized.

In the case of aspherical lenses, the best image focal point may be located in the focal point, and in this case, the radius of curvature of the lenses can be set so that $f=T/n_2$ can be satisfied in accordance with the thickness T of the substrate and the index of refraction $n_2$ of the substrate, and thus, the amount of light that transmits through the openings can be maximized.

The spot where light is collected in the vicinity of the openings 15 for transmitting light is blurry when the lower substrate 17 is thinner than the best image focal distance as found using the formula (6), and therefore, the change in the brightness can be made smooth, without changing the brightness in the front, and thus, the view angle can be widened.

In the case where the normalized radius of curvature is greater than 1, the amount of light which transmits is reduced, and the view angle is narrowed, but the brightness in the front increases, when the radius of curvature in the case of $T=n_2 f$ is $R_0$, the actual radius curvature is R, and $R/R_0$ is the normalized radius of curvature.

Accordingly, in the case where the brightness in the front is important, it is desirable to increase the radius of curvature. Meanwhile, in the case where the normalized radius of curvature is smaller than 1, the amount of light which transmits and the brightness in the front decrease, while the view angle first widens and then narrows.

Thus, it is desirable for the radius of curvature to be small in the case where the front is high. The view angle becomes maximum when the normalized radius curvature is close to 0.9, and the view angle is wider when the normalized radius of curvature is 0.75 or greater than when it is 1. Accordingly, it is desirable for the normalized radius of curvature to be 0.75 or more and 1 or less, in order to make the view angle wide.

Next, the wobbled arrangement of the lenticular lenses 1 according to the present embodiment is described in further detail.

In FIG. 4, the edges of the lenticular lenses 1 are wobbled in sinusoidal waveform, so that the two ends change so that they are almost in the same phase.

When the two phases of the edges slightly shift, the lens intervals change as viewed in a cross section along the direction y. When the location of one edge in the nth lens can be represented by formula (8) below in the wobbled arrangement, while the other edge shifts by Dc in the direction x in the same wobbled arrangement, the location of the edge of the lens can be represented by formula (9) below.

[Formula 8]

$$f_1^n(x) = W_b \sin\left(2\pi \frac{x}{P_w} + \delta^n\right) + \frac{W_e}{2} \qquad (8)$$

[Formula 9]

$$f_2^n(x) = f_1^n(x - D_c) - W_e = W_b \sin\left(2\pi \left(\frac{x - D_c}{P_w}\right) + \delta^n\right) - \frac{W_e}{2} \qquad (9)$$

In the case where the lenses are formed by curing a liquid lens material, the center of the lenticular lenses 2 is located in the vicinity of the center of the width, and therefore, the location $f_c^n$ of the center of the lenticular lenses 2 can be represented by the following formula:

[Formula 10]

$$f_c^n(x) = \frac{f_1^n(x) + f_2^n(x)}{2} \qquad (10)$$

$$= W_b \cos\left(\pi \frac{D_c}{P_w}\right) \sin\left(2\pi\left(\frac{x}{P_w} - \frac{D_c}{2P_w}\right) + \delta^n\right)$$

Accordingly, the width $S_c$ in the wobbled arrangement in this case can be represented by the following formula:

[Formula 11]

$$S_c = 2W_b \cos\left(\pi \frac{D_c}{P_w}\right) \qquad (11)$$

It is necessary for the width $S_c$ in this wobbled arrangement to be great enough reduce the moiré effects, as described above. Meanwhile, it is desirable for $S_c$ to satisfy the formula (3) or the formula (4), in order to prevent the brightness in the front from lowering.

In addition, the width $W_r^n$ of the nth lenticular lens 1 can be represented by the following formula:

[Formula 12]

$$W_r^n(x) = f_1^n(x) - f_2^n(x) \qquad (12)$$

$$= W_e + 2W_b \sin\left(\pi \frac{D_c}{P_w}\right) \cos\left(2\pi\left(\frac{x}{P_w} - \frac{D_c}{2P_w}\right)\right)$$

In the case where the lenses are formed of a liquid material, the height of the lenses changes, so that the radius of curvature becomes approximately constant in accordance with the change in the width of the lenses. That is to say, in the case where the radius of curvature R of the lenses is constant, the following holds between the lens width $W_r$ and the lens height $H_r$.

[Formula 13]

$$H_r = R - \sqrt{R^2 - W_r^2} \qquad (13)$$

When the height of the lenses changes, light diffusion is possible in a direction perpendicular to the direction lenses 1 collect right, and thus, the view angle can be widened.

In addition, effects of reducing moiré fringes can also be gained.

Furthermore, in the case of $\delta^k = -2\pi k(D_c/P_w)$, the distance between the center of the (k+1)th lenticular lens 1 and the center of the adjacent kth lenticular lens 1 can be represented by the following formula:

[Formula 14]

$$P_l^k = f_c^{k+1} - f_c^k(x) \qquad (14)$$

$$= P_c - \frac{W_b}{2} \sin\left(2\pi \frac{D_c}{P_w}\right) \cos\left(2\pi\left(\frac{x}{P_w} - (k+1)\frac{D_c}{P_w}\right)\right)$$

The moiré pattern can be represented by the following formula in this case:

[Formula 15]

$$I_m(y) = \cos\left(2\pi y\left(\frac{1}{P_m} + \frac{lW_b}{2P_c^2} \sin\left(2\pi \frac{D_c}{P_w}\right) \cos\left(2\pi\left(\frac{x}{P_w} - \frac{D_c}{P_w}\frac{y}{P_c}\right)\right)\right)\right) \qquad (15)$$

The moiré pattern depends on the y coordinate, and therefore, the moiré intervals $P_m$ change in the cross section along the direction of the y axis.

Thus, the moiré intervals are not constant, but vary in the direction of the alignment of the lenticular lenses 1. Therefore, the arrangement of the lenticular lenses 1 is less regular, the frequency component is reduced, and the moiré intensity lowers.

In addition, the moiré location changes in the direction of the x axis, and therefore, the phase of the moiré fringes changes, and it becomes difficult for moiré fringes to appear.

Furthermore, the intervals of the lenticular lenses 1 vary, and therefore, components having different frequencies are superposed around the spatial frequency $(1/P_c)$ as determined by the intervals $P_c$, and thus, there are effects of reducing moiré fringes.

In addition to the above described change in the position of the center of the lenticular lenses 2, when the center line of the lenticular lenses 1 is changed as in the formula (16), in terms of the direction y, that is to say, so-called frequency modification is carried out, the Fourier coefficient of the intervals $P_c$ when the center line of the lenses is Fourier converted can be represented by the formula (17), unlike in the case where the arrangement is not wobbled.

[Formula 16]

$$f_c^n = nP_c + S_c \cos\left(m_f \sin\left(\frac{n\omega}{P_c}\right) + \phi\right) \quad (16)$$

[Formula 17]

$$1 - \left(\frac{m_f}{2}\right)^2 \quad (17)$$

Thus, the fundamental frequency component of the lenticular lenses 1 becomes smaller when the arrangement is wobbled, and therefore, the moiré intensity can be reduced.

Furthermore, in the case where the arrangement is wobbled, as described above, there are a number of spatial frequency components $(1/P_c) \pm N\omega$, where N is a natural number, and therefore, the frequency components are superposed, and the moiré effects are reduced.

In the case where the intervals between the centers of the lenticular lenses 2 are modified so that the moiré intensity is reduced, as described above, it can be confirmed that there are effects when the maximum amount of displacement in the intervals between the centers of the lenticular lenses 2 is 4% or more, or desirably, 8% or higher, than the average value of the intervals between the centers of the lenticular lenses 2, that is to say, equal pixel intervals $P_c$, in the present embodiment.

It is desirable for the amount of displacement in the intervals to be 3 μm or more, or 6 μm or more, in the case where the pixel intervals are 75 μm, for example. It is desirable for the amount of displacement in the intervals to be 6 μm or more, or 12 μm or more, in the case where the pixel intervals are 150 μm.

As described above, in the present embodiment, the moiré phase changes, and there are effects of making it hard for moiré fringes to appear, and there are effects of reducing the moiré intensity.

It is desirable for the intervals $P_w$ of the lenticular lenses 1 in the wobbled arrangement to be small enough for the wobbling to be invisible. Therefore, it is desirable for $P_w$ to be smaller than approximately 50 lines/degree, which is the cut-off spatial frequency for the sensitivity of the eye. Since displays are usually viewed at a distance of approximately 30 cm, it is desirable for $P_w$ to be 100 μm or less. It is desirable for $P_w$ to be no greater than 3 times the pixel intervals $P_c$, desirably no greater than the pixel intervals $P_c$.

In addition, it is difficult to form lenses when the curvature of the wobbling is great, and thus, it is desirable for $P_w$ to be greater than $S_c$, and it is more desirable for $P_w$ to be three times greater than $S_c$, or five time greater than $S_c$.

Furthermore, it is desirable to select the intervals $P_w$ in the wobbled arrangement so that there are no moiré effects due to the regularity of the openings 15 in the direction x (sub-pixels in the present embodiment), and in addition, it is desirable for the intervals $P_w$ in the wobbled arrangement not to be constant but vary at random. In the case where $P_w$ varies in this manner, the average value in one lenticular lens 1 or the average value within the liquid crystal display element 57 may be used as $P_w$. Alternatively, $P_w$ may be set from the peak of the spatial frequency when Fourier transform.

In the case where the phase of the edges between adjacent lenticular lenses 1 varies, as in the present embodiment, it is desirable for spaces 4 to be secured between adjacent lenticular lenses 1, so that they do not make contact, and this is necessary in order for the phase of the ends between adjacent lenticular lenses 1 to vary.

Therefore, it is desirable for the arrangement of the ends of adjacent lenticular lenses 1 to be wobbled with a certain relationship, in order to secure spaces 4 between the lenses, as well as in order to secure a large width for the lenticular lenses 1 and thus increase the effects of light collection by the lenticular lenses 1.

Second Embodiment

In the following, the second embodiment, which is the best mode for carrying out the present invention, is described in detail in reference to FIGS. 6 and 7.

Figure 6:
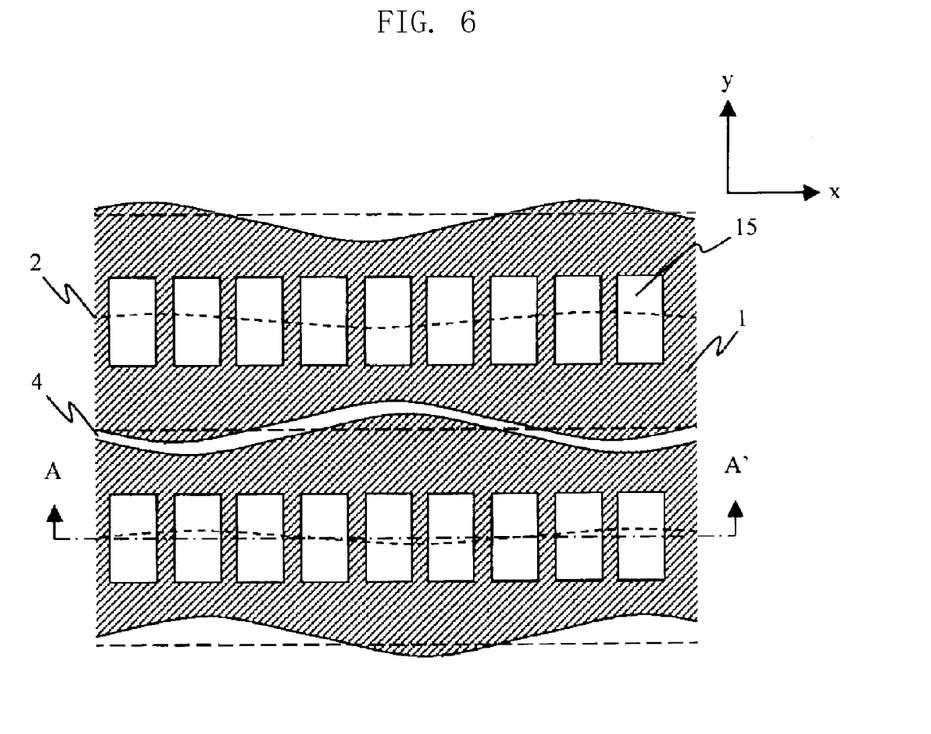
FIG. 6 is a front diagram showing wobbling of the lenticular lenses according to the second embodiment of the present invention.
Figure 7:
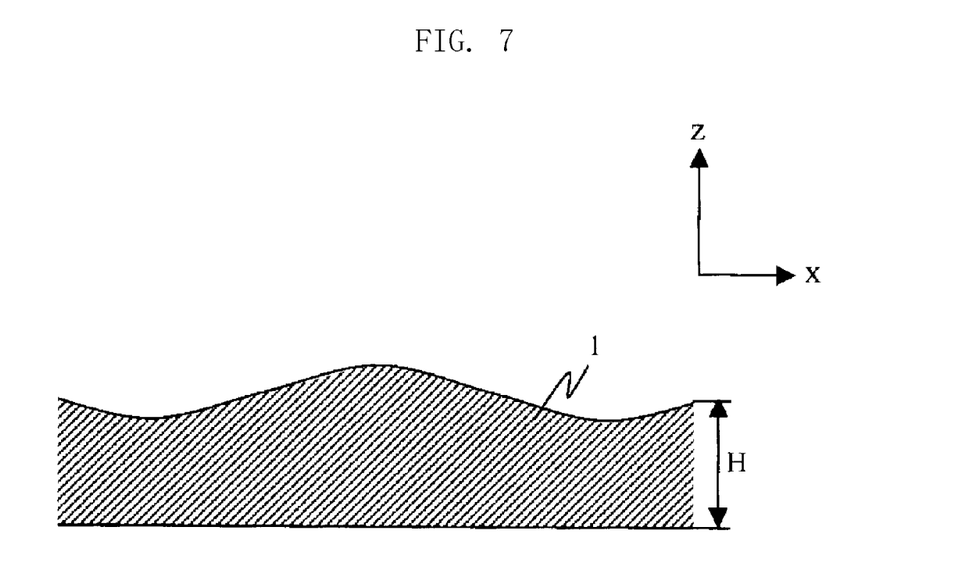
FIG. 7 is a cross sectional diagram showing the lenticular lenses according to the second embodiment of the present invention.

FIGS. 6 and 7 show the lenticular lenses 1 in the wobbled arrangement according to the second embodiment.

FIG. 6 is a front diagram showing lenticular lenses 1, and FIG. 7 is a cross sectional diagram showing the lenticular lenses in FIG. 6 along A-A'.

In the second embodiment, the phases of the two ends of the lenticular lenses 1 are different by approximately 180°. That is to say, $D_c/P_w \approx 0.5$ in the formula (9).

Furthermore, the spaces between adjacent lenses slightly shift, as in the first embodiment. This variation greatly changes the width of the lenses.

As shown in FIG. 7, the height of the lenses varies in accordance with the change in the width of the lenses. Thus, the height of the lenses varies, and it becomes difficult for moiré fringes to appear due to scattering of light in the lateral direction.

The distance between the centers 2 of the lenticular lenses also varies in accordance with the formula (14), and therefore, the intervals of the lenticular lenses 2 also change, and the moiré intensity lowers.

Third Embodiment

In the following, the third embodiment, which is the best mode for carrying out the present invention, is described in detail in reference to FIG. 8.

Figure 8:
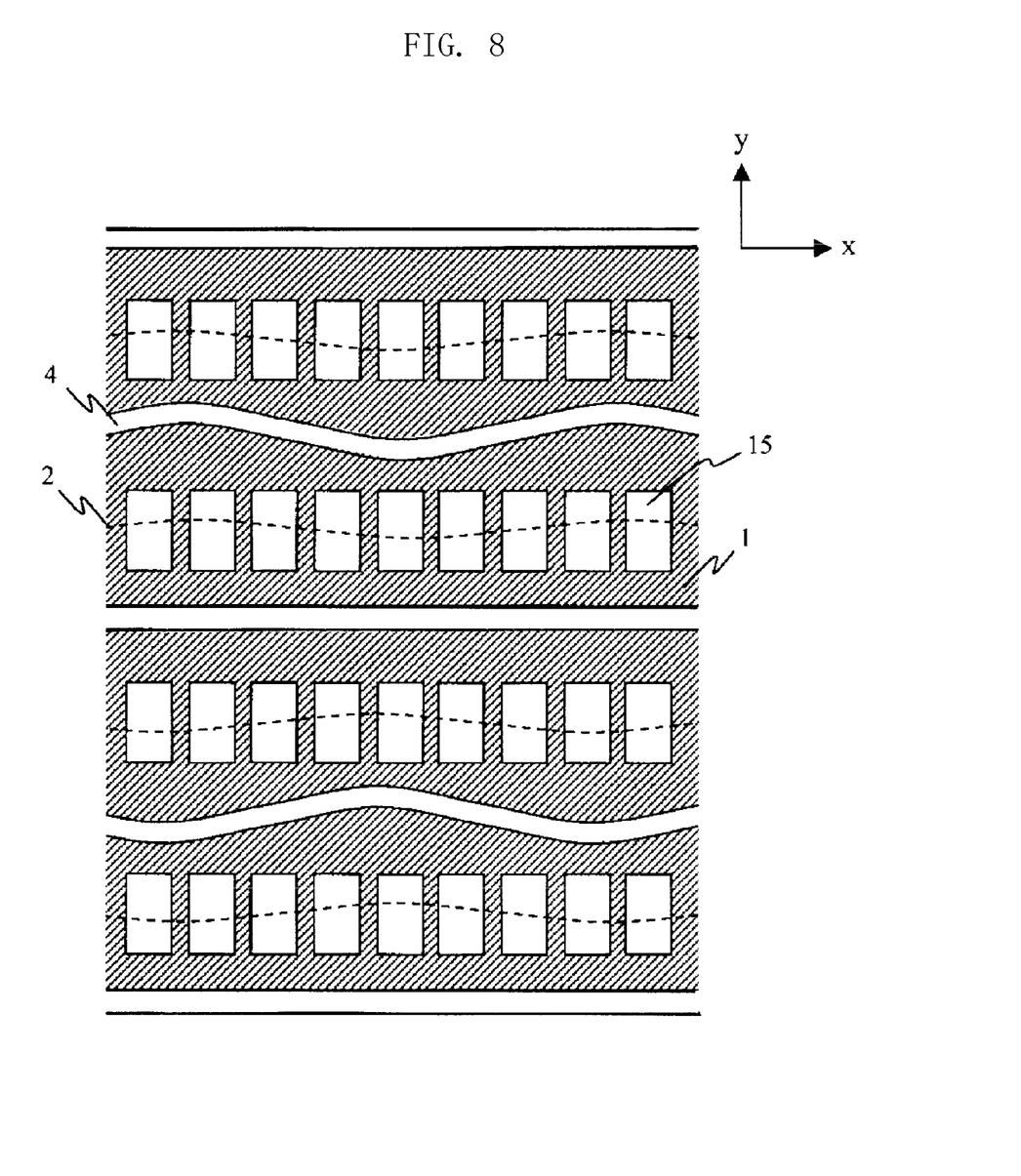
FIG. 8 is a front diagram showing wobbling of the lenticular lenses according to the third embodiment of the present invention.

FIG. 8 shows the lenticular lenses 1 in the wobbled arrangement according to the third embodiment.

FIG. 8 is a front diagram showing the lenticular lenses 1.

In the present embodiment, one end of the lenses is in the wobbled arrangement, and the other end is in a straight line. That is to say, $f_2''$ is set constant, unlike in the formula (8) and the formula (9).

Therefore, the center line of the lenticular lenses 2, and the width and height of the lenticular lenses 1, are changed to a medium value between that in the first embodiment and that in the second embodiment. Moiré fringes can be reduced as a result of the synergetic effects of these.

In addition, the center line of the lenticular lenses 2 can be made random for every two lenticular lenses 1, and therefore, the intensity of the spatial frequency component $1/P_c$ in the center line of the lenticular lenses 2 can be decreased a great deal, and thus, there are great effects of reducing moiré fringes.

Though a case where lenticular lenses are put in a wobbled arrangement in sinusoidal waveform is shown in the above, the present invention is characterized in that the center line, the width and the height of the lenticular lenses is changed, and the form of the wobbled arrangement is not particularly limited.

The wobbled arrangement may be in a triangular waveform with bends instead of in sinusoidal waveform, or rectangular waveform is also possible. Alternatively, the center line and width may be changed at random, without any regularity.

In addition, the cross section of the lenticular lenses 1 is generally in arc form, but the lenticular lenses 1 may be aspherical, so that light can be collected efficiently in the openings for transmitting light 15.

Particularly in the case where the lower substrate 17 is thin and the radius of curvature of the lenticular lenses is small, it is effective to use aspherical lenses.

In the case where a liquid lens material is used, it is possible to form aspherical lenses by adjusting the viscosity of the lens material, the wettability on the lower substrate 17, and the manufacturing method.

Though the ridge lines of the lenticular lenses are in the direction in which sub-pixels are aligned (direction x) in the above, they may be in the longitudinal direction (direction y). In this case, the lenticular lenses 1 can each correspond to one color filter, and thus, it is desirable for the openings to have a large $W_a$ and be long in the longitudinal direction. In addition, the direction in which the directivity of the backlight 59 is high matches the direction in which the lenses collect light. Alternatively, the arrangement of the sub-pixels may be changed so that the color filters are aligned in the lateral direction.

In the present embodiment, the lenticular lenses 1 are formed on the lower substrate 17, and it is desirable for the polarizing plate 7b to be secured to the substrate, so that foreign matter can get into the space between the polarizing plate and the lenticular lenses 1.

Here, the polarizing plate 7b may be provided between the liquid crystal layer 13 and the backlight 59, or it may be formed on another transparent substrate with the direction of the lenticular lenses 1 inverted upside-down, and in this case, the polarizing plate 7b may be pasted to the transparent substrate.

In addition, the lenticular lenses 1 may be coated with a material having a different index of refraction so as to be buried under a flat surface.

In addition, the polarizing plate 7b is pasted to the lower substrate 17, and lenticular lenses 1 may be formed on top of this. In the case where lenticular lenses 1 are formed on the polarizing plate 7b, the thickness T of the lower substrate 17 may be taken to be as follows.

[Formula 18]

$$n_1(T/n_1 + T_p/n_p) \qquad (18)$$

Here, $T_p$ is the thickness of the polarizing plate, and $n_p$ is the index of refraction of the polarizing plate.

In the case where the lenticular lenses 1 are buried, it is desirable to paste the polarizing plate 7b on a flat surface, so that reflection from the surface of the lenticular lenses 1 and the polarizing plate 7b can be prevented.

In addition, in the case where the polarizing plate 7b is pasted to the lower substrate 17 and lenses are formed on top of this, or in the case where the lenses are buried in a material having a different index of refraction, the number of interfaces making contact with the air is small, and thus, reflection from the surface can be reduced.

The surface light emitting element in the present embodiment emits light beams having high directivity in the direction of one axis in accordance with the direction in which the lenticular lenses 1 collect light, and light can be collected using the lenticular lenses 1 even in the case where light from the backlight is highly collimated in every direction.

In this case, the view angle can be widened by providing a hologram sheet, a lenticular lens sheet, a prism sheet or a lens array sheet on the liquid crystal display element 57 on the side from which light is emitted. Alternatively, a hologram sheet, a lenticular lens sheet or a prism sheet may be provided between the back light 59 and the liquid crystal display element 57, so that the spread angle in the direction of one axis can be widened.

Light emitted from the light guiding plate 31 enters through the entrance surface of the prism sheet 39 at a certain angle, and therefore, the reflectance of the entrance surface of the prism sheet 39 is different between P polarization and S polarization, whereas light beams emitted from the prism sheet 39 are polarized, so that P polarization becomes the main component.

Therefore, it is desirable to set the direction of the polarizing plate 7b so that it matches the direction of polarization. In addition, the polarization may be negated by making the prism sheet 41 birefringent in the case where the direction of the polarizing plate 7b cannot be adjusted, or a phase contrast sheet may be provided between the prism sheet 41 and the polarizing plate 7b.

In the case where the prisms are located in the vicinity of the focal point of the lenses, the moiré effects become significant. Therefore, in the case where a polarizing plate is sandwiched between the lenticular lenses 1 and the prism sheet with upward facing prisms (so-called normal prisms), as in the present embodiment, moiré fringes easily appear. Therefore, in the case where upward facing prisms are used, the effects of the wobbled arrangement of the lenticular lenses 1 are great.

When the lenticular lenses 1 are put in a wobbled arrangement, the moiré effects can be sufficiently reduced, even when the distance between the lenticular lenses 1 and the prisms is small in comparison with in the prior art.

In addition, the present invention can be applied to cases where downward facing prisms (so-called inverted prisms) are used. In the case of downward facing prisms, the distance between the lenticular lenses 1 and the prisms can be increased in comparison with in the case of upward facing prisms, and thus, it is easy to reduce the moiré effects.

In the present embodiment, the openings for transmitting light 15 are approximately in rectangular form. In the case where the openings for transmitting light are not rectangular, and the center of the openings for transmitting light is not clear, the openings for transmitting light and the center of the lenses can be regarded as coinciding when light enters perpendicular to the lower substrate 17 and the distribution in the brightness of light emitted from the opening has a peak in the front.

The shift from this positional relationship may be regarded as a shift between the openings and the lenses.

In addition, though polarizing plates 7 are used in the present embodiment, circular polarizing plates may be used instead of polarizing plates 7 in the case of a display mode that requires circular polarizing plates.

In addition, a reflective polarizing plate may be provided on the polarizing plate 7b on the backlight 59 side, so that light polarized in such a direction as to be absorbed by the polarizing plate 7b reflects from the reflective type polarizing plate and returns to the backlight 59 side for reuse, and thus, the efficiency of light for use can be increased.

In FIG. 1, light emitted from the backlight is adjusted by means of the second prism sheet 41, so that the peak in the brightness is located in the front direction. However, it is not necessary for the peak in the brightness to be completely directed in the front direction, and the peak in the brightness can be adjusted in the front direction by means of the lenticular lenses 1 in the case where the directivity is intense and the peak in the brightness is high when the peak in the brightness is directed in a direction slightly inclined from the front.

That is to say, in this case, the brightness in the front direction can be enhanced after light transmits through the lenses, when the average point of the center of the lenses relative to light beams that enter diagonally shifts from the openings.

There are no particular limitations to the display mode of the liquid crystal display element 57 according to the present invention, and any of IPS (in-plane switch) mode, VA (vertical alignment) mode and TN (twist nematic) mode are appropriate for use.

What is claimed is:

1. A liquid crystal display element, comprising:
a pair of substrates, upper and lower;
a pair of polarizing plates sandwiching said pair of substrates from the top and the bottom;
a liquid crystal layer sandwiched between said pair of substrates; and
a number of openings for transmitting light which are created within pixels provided on one of said substrates and regulate the amount of light which transmits through said liquid crystal layer, characterized in that
light collecting elements for collecting light in said openings for transmitting light are provided on said lower substrate side, and
said light collecting elements are formed continuously so as to correspond to said number of openings for transmitting light, and the form of said light collecting elements varies in a plane parallel to said lower substrate,
wherein the interval of the displacement of said light collecting elements in the column direction is 100 μm or less or the interval of said pixels or less.

2. The liquid crystal display element according to claim 1, wherein
said light collecting elements are formed such that the center line of said light collecting elements is displaced relative to said respective openings for transmitting light.

3. The liquid crystal display element according to claim 1, wherein
the width of said light collecting elements varies and the height of said light collecting elements varies, correlating to the width of said light collecting element.

4. The liquid crystal display element according to claim 1, wherein
the maximum value of the displacement of the center line of said light collecting elements is smaller than the width of said openings for transmitting light.

5. The liquid crystal display element according to claim 1, wherein
the focal distance of the light collecting elements within a column where the light collecting elements are formed continuously is approximately constant.

6. The liquid crystal display element according to claim 1, 2 or 3, wherein
said light collecting elements are formed by patterning the application of a liquid material, and after that, curing the liquid material.

7. The liquid crystal display element according to claim 6, wherein
the application of said liquid material is patterned using offset printing.

8. The liquid crystal display element, comprising:
a pair of substrates, upper and lower;
a pair of polarizing plates sandwiching said pair of substrates from the top and the bottom;
a liquid crystal layer sandwiched between said pair of substrates; and
a number of openings for transmitting light which are created within pixels provided on one of said substrates and regulate the amount of light which transmits through said liquid crystal layer, characterized in that
light collecting elements for collecting light in said openings for transmitting light are provided on said lower substrate side, and
said light collecting elements are formed continuously so as to correspond to said number of openings for transmitting light, and the form of said light collecting elements varies in a plane parallel to said lower substrate,
wherein the difference between adjacent light collecting elements is 4% or more of the interval of said pixels.

9. A liquid crystal display device having a liquid crystal display element, comprising:
a pair of substrates, upper and lower;
a pair of polarizing plates sandwiching said pair of substrates from the top and the bottom;
a liquid crystal layer sandwiched between said pair of substrates;
a number of openings for transmitting light which are created within pixels provided on one of said substrates and regulate the amount of light which transmits through said liquid crystal layer; and
light collecting elements for collecting light in said openings for transmitting light are provided on said lower substrate side, characterized in that
the lower side of the polarizing plate on the lower side of said liquid crystal display element is provided with a surface light emitting element having:
a prism sheet having a number of prism columns;
a light guiding plate for transmitting a light beam that enters from a light source by repeatedly reflecting the light beam; and
a reflective sheet provided on the side opposite to the side of said light guiding plate from which light emits, wherein
the form of said light collecting elements which are formed continuously so as to correspond to said number of openings for transmitting light varies in a plane parallel to said lower substrate, and the maximum value of the displacement of the center of said light collection elements is 1/16 or greater of the interval of said prism columns on said prism sheet.

10. The liquid crystal display device according to claim 9, wherein
said light collecting elements are formed such that the center line of said light collecting elements is displaced relative to said respective openings for transmitting light.

11. The liquid crystal display device according to claim 9, wherein
the width of said light collecting elements varies and the height of said light collecting elements varies, correlating to the width of said light collecting element.

12. The liquid crystal display device according to claim 9, wherein
the ridge lines of said light collecting elements are approximately parallel to the ridge lines of said prism columns.

13. The liquid crystal display device according to claim 9, wherein
said light collecting elements and said prism columns on said prism sheet are arranged so as to face each other.

14. The liquid crystal display device having a liquid crystal display element, comprising:
a pair of substrates, upper and lower;
a pair of polarizing plates sandwiching said pair of substrates from the top and the bottom;
a liquid crystal layer sandwiched between said pair of substrates;
a number of openings for transmitting light which are created within pixels provided on one of said substrates and regulate the amount of light which transmits through said liquid crystal layer; and
light collecting elements for collecting light in said openings for transmitting light are provided on said lower substrate side, characterized in that
the lower side of the polarizing plate on the lower side of said liquid crystal display element is provided with a surface light emitting element having:
a prism sheet having a number of prism columns;
a light guiding plate for transmitting a light beam that enters from a light source by repeatedly reflecting the light beam; and
a reflective sheet provided on the side opposite to the side of said light guiding plate from which light emits,
wherein the form of said light collecting elements which are formed continuously so as to correspond to said number of openings for transmitting light varies in a plane parallel to said lower substrate, and
wherein the interval $P_s$ of said prism columns on said prism sheet satisfies $$P_s < 4(W_a - 2f\tan(\theta/2))$$

where the view angle of said light emitting elements is $\theta$, the focal distance of said light collecting elements is $f$, and the width of said openings for transmitting light is $W_a$.

15. The liquid crystal display device according to claim 14, wherein
the angle of the light emission relative to a line perpendicular to said surface light emitting element is 14° or less.

* * * * *